United States Patent

Kanai

[11] Patent Number: 5,666,654
[45] Date of Patent: Sep. 9, 1997

[54] METHOD OF CHANNEL ALLOCATION IN A MOBILE TELEPHONE SYSTEM

[75] Inventor: Toshihito Kanai, Tokyo, Japan

[73] Assignee: NEC Corporation, Tokyo, Japan

[21] Appl. No.: 245,484

[22] Filed: May 18, 1994

[30] Foreign Application Priority Data

May 18, 1993 [JP] Japan ................................ 5-115466

[51] Int. Cl.$^6$ .................................................. H04Q 7/20
[52] U.S. Cl. ........................ 455/512; 455/62; 455/522; 455/450
[58] Field of Search ........................... 455/33.1, 34.1, 455/34.2, 54.1, 62, 63, 67.1, 69, 33.2, 54.2; 379/59, 60

[56] References Cited

U.S. PATENT DOCUMENTS

| | | | |
|---|---|---|---|
| 5,396,649 | 3/1995 | Hamabe | 455/34.1 |
| 5,442,807 | 8/1995 | Takayama | 455/34.1 |
| 5,448,750 | 9/1995 | Eriksson et al. | 455/54.1 |
| 5,448,751 | 9/1995 | Takenaka et al. | 455/54.1 |

OTHER PUBLICATIONS

Toshihito Kanai, "Autonomous Reuse Partitioning in Cellular Systems", Vehicular Technology Society 42nd VTS Conference Frontiers of Technology, Denver, CO, May, 1992, pp. 782–785.

*Primary Examiner*—Reinhard J. Eisenzopf
*Assistant Examiner*—Doris To
*Attorney, Agent, or Firm*—Sughrue, Mion, Zinn, Macpeak & Seas

[57] ABSTRACT

The invention provides channel allocation method which achieves a high frequency utilization efficiency while suppressing the average transmission power by transmission power control. Selection priority degrees and initial minimum transmission power control amounts are set for all radio channels allocated to the system. The initial minimum transmission power control amounts are set such that the radio channel having higher selection priority degree has higher or at least equal initial minimum transmission power control amount than the lower selection priority radio channel. Upon channel allocation, a radio channel is selected in accordance with the selection priority degree, by the way that calculating the transmission power control amount of the radio channel (S505 to S507), comparing the transmission power control amount with the initial minimum transmission power control amount (S508), and when the transmission power control amount is equal to or higher than the initial minimum transmission power control amount, then use of the radio channel is permitted.

38 Claims, 15 Drawing Sheets

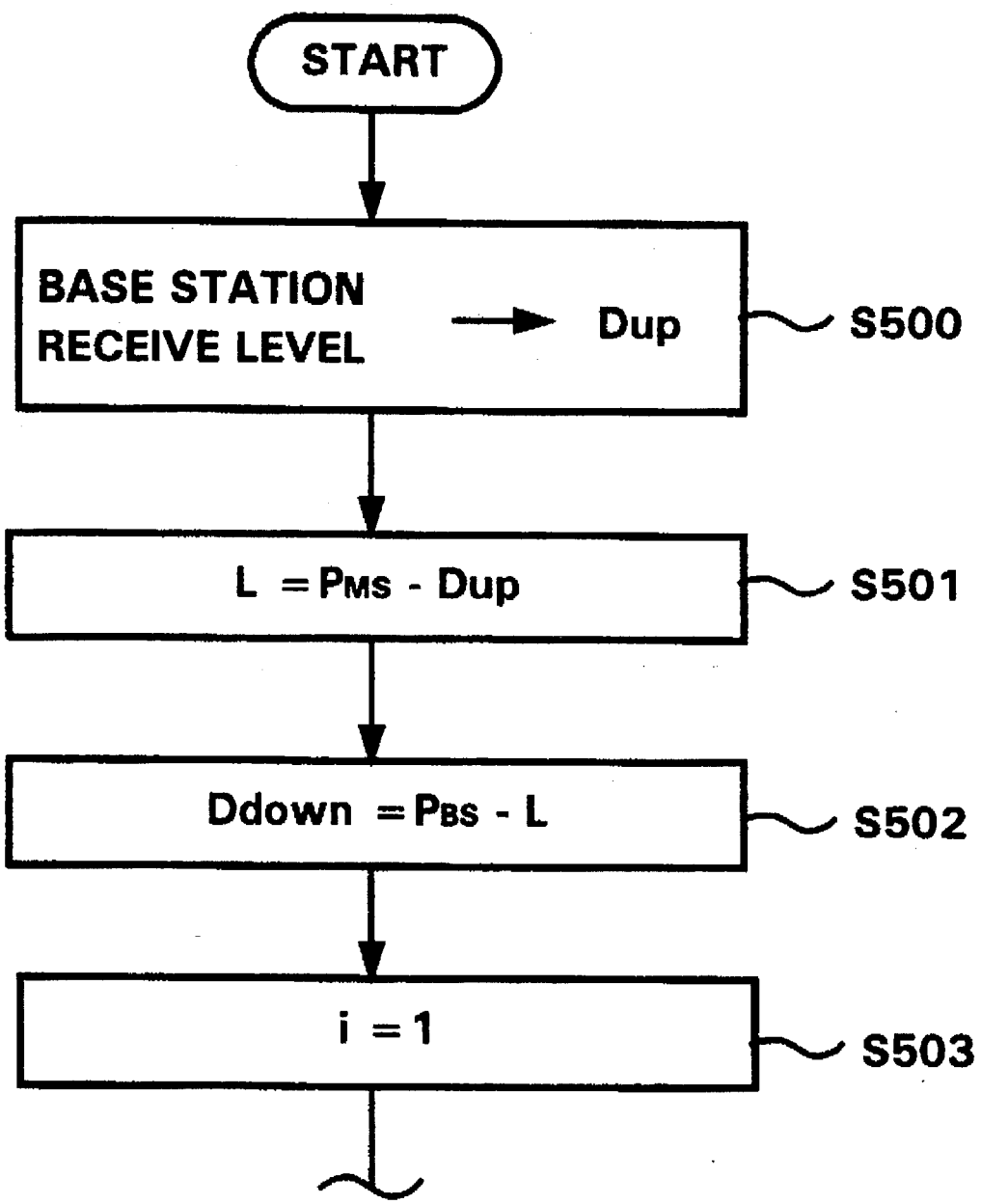

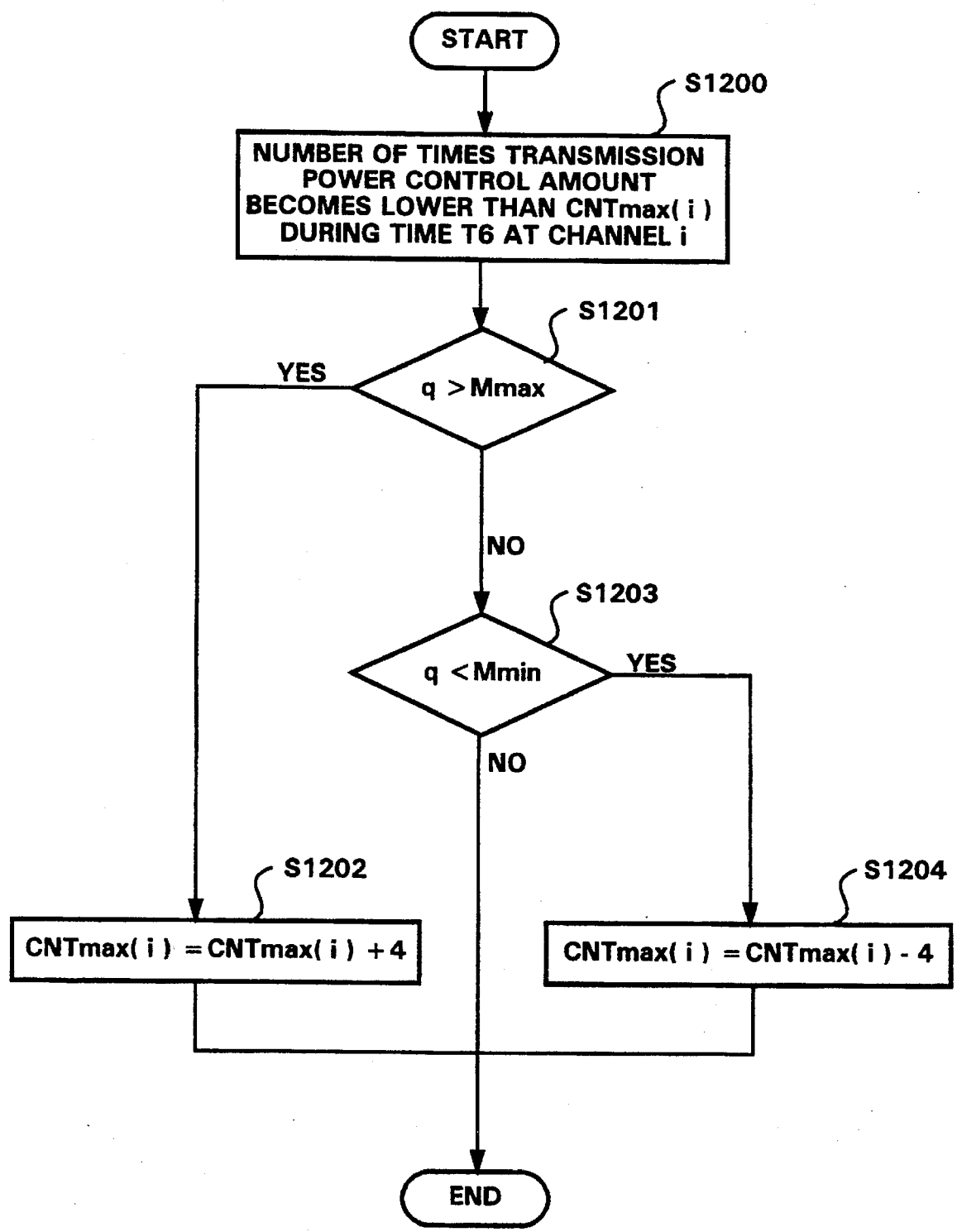

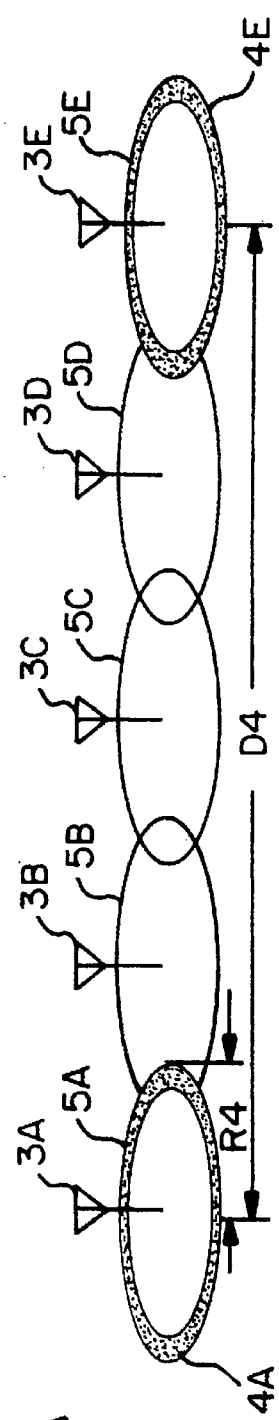
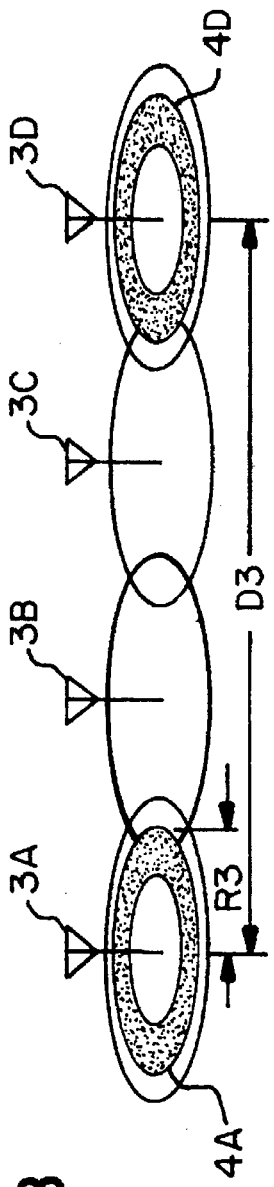
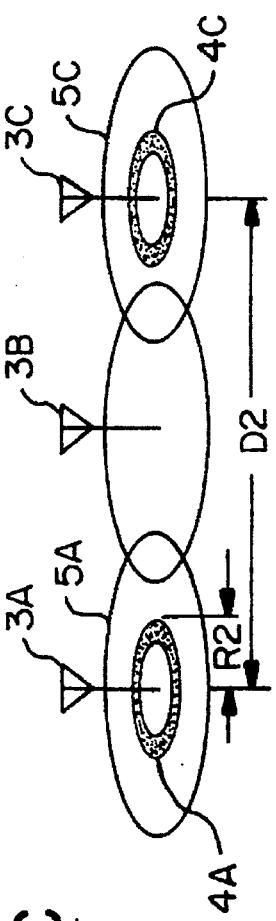
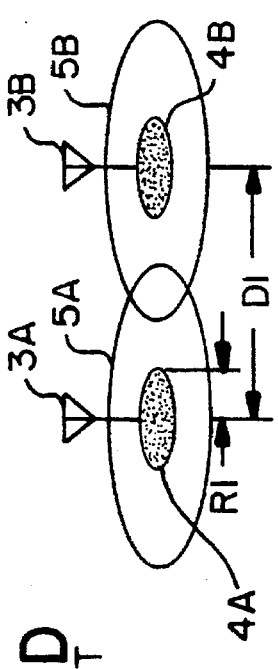
FIG.14A PRIOR ART (A) CHANNEL 4
FIG.14B PRIOR ART (B) CHANNEL 3
FIG.14C PRIOR ART (C) CHANNEL 2
FIG.14D PRIOR ART (D) CHANNEL 1
3A~3E BASE STATIONS
4A~4E MOBILE STATION PRESENCE AREAS
5A~5E CELLS

METHOD OF CHANNEL ALLOCATION IN A MOBILE TELEPHONE SYSTEM

BACKGROUND OF THE INVENTION

1. Field of the Invention

This invention relates to a dynamic channel allocation method in a cellular mobile telephone system.

2. Description of the Related Art

In a radiocommunications system of large capacity such as a mobile telephone system, the service area is covered by a plurality of base stations and channels with the same frequency are used by the base stations among which no interference disturbance occurs in order to achieve effective use of frequencies. The mobile telephone system just described is called a cellular system.

Allocation of channels to be used by base stations is roughly divided into two methods. According to one of the methods, channels to be used by each base station are allocated fixedly in advance so that no interference disturbance may occur as a result of predicting the propagation characteristics. This method is called fixed channel allocation and is adopted in present-day mobile telephone system. The other method is called dynamic channel allocation in which a channel which does not cause interference disturbance is selectively used for each communication. While this method requires a complicated apparatus construction, since it allows free use of any channel so long as it does not cause interference disturbance, it is advantageous in that the number of subscribers which can be accommodated is greater than that of the fixed channel allocation. Accordingly, adopting the dynamic channel allocation for a mobile telephone system is undergoing research.

For the dynamic channel allocation method, an autonomous reuse partitioning (hereinafter referred to simply as ARP) method to realize channel allocation with a highly efficient utility of frequency and very simple control has been proposed as disclosed, for example, in a paper published under the title of Autonomous Reuse Partitioning in Cellular Systems, Proceedings of IEEE Vehicular Technology Society, 42th VTS Conference, pp. 782–785, May, 1992.

In the ARP system, channels are selected in accordance with the same of channel number order at all cells, and put into use from a channel which presents a carrier-to-interference ratio (hereinafter referred to as CIR) higher than the required value in both reverse-link (mobile station to base station) and forwards-link (base station to mobile station).

FIG. 1 is a flow chart illustrating control of a base station to which the conventional ARP system is applied.

It is assumed that n channels numbered 1 to n are available at each base station, and that each base station periodically receives and stores interference wave levels $U_{up}(i)$ of available free channels where i represents the channel number from 1 to n. Further, it is assumed that the transmission power level (hereinafter abbreviated to $P_{MS}$) of the mobile station and the transmission power level of the base station (hereinafter abbreviated to $P_{BS}$) are known.

When a call request is occurred, the base station stores a receive level of a request for call origination signal (when the call is originated from the mobile station) received through a control channel, or a call response signal (when a mobile station is called) to the call from the mobile station as reverse-link carrier level $D_{up}$(step 1300).

In the following description, steps are abbreviated to S so that step 1300 is represented as S1300.

The value obtained by subtracting $D_{up}$ from $P_{MS}$ is assumed as the propagation loss (hereinafter referred to as L in abbreviation) between the base station and the mobile station (S1301).

Since the loss level (L) of the radio propagation of reverse-link and forward-link is reversible, the forward-link carrier level ($D_{down}$) at the mobile station can be determined by subtracting L from $P_{BS}$ (S1302).

Assuming channel number to 1 (S1303), the value obtained by subtracting the reverse-link interference wave level of channel 1 ($U_{up}(1)$) from $D_{up}$, that is, the reverse-link CIR is compared with a required value (hereinafter abbreviated to $CIR_{th}$) (S1304).

When the reverse-link CIR is equal to or higher than $CIR_{th}$, the base station instructs the mobile station to measure the forward-link interference wave level of channel 1($U_{down}(1)$) and receives the result of measurement from the mobile station (S1305).

The base station then compares the value obtained by subtracting $U_{down}(1)$ from $D_{down}$, that is, the reverse-link CIR, with $CIR_{th}$ (S1306).

As a result, if the forward-link CIR also is equal to or higher than $CIR_{th}$, then the base station allocates channel 1 to the call request (S1307).

On the contrary, when the reverse-link CIR or the forward-link CIR of channel 1 is lower than $CIR_{th}$, the base station increments channel number i by one to select next channel 2 (S1309), and thereafter, the processes from S1304 to S1306 are repeated in a similar manner to determine the interference condition.

When the determination for final channel n (S1308) proves that no available channel has been found, the call is blocked (S1310).

By this procedure, a channel having a higher priority degree, that is, a channel whose channel number is closer to 1, presents a higher interference wave level and is allocated to a mobile station closer to a base station which presents a higher $D_{up}$. On the other hand, since a channel having a lower priority degree presents a lower interference wave level, it is allocated to a mobile station closer to the boundary of the cell which presents a lower $D_{up}$.

FIGS. 14(A) to 14(D) are diagrammatic views illustrating the relationship between the base stations and the mobile stations of channels 4 to 1 when the channel allocation method illustrated in FIG. 1 is applied.

Base stations 3A to 3E have cells 5A to 5E, respectively as service areas, and channel 1 is a channel having the highest priority degree and is preferentially allocated when, for example, as seen in FIG. 14(D), a mobile station is present in cell 5A in mobile station presence area 4A which is within radius R1 from base station 3A. In this instance, also in base station 3B adjacent to base station 3A, the identical channel is allocated for communication with a mobile station within mobile station presence area 4B within radius R1 from base station 3B and used simultaneously.

Meanwhile, when a mobile station positioned in cell 5A is present within mobile station presence area 4A between radius R1 and radius R2 from base station 3A as shown in FIG. 14(C), channel 2 which has the second highest priority order is allocated to the mobile station. In this instance, for example, also in base station 3C (located farther than base station 3B from base station 3A) having cell 5C, identical channel 2 is simultaneously allocated for communication between a mobile station present within mobile station presence area 4C within radius R2 from base station 3C.

This similarly applies to the other channels, and if channel 4 has the lowest priority degree, when mobile station presence area 4A is in the proximity of radius R4 from base station 3A which is in the proximity of the outermost circumference of cell 5A, channel 4 is allocated to a mobile station within cell 5A as seen in FIG. 14(A).

In this instance, also for base station 3E located farther from base station 3A, if a mobile station is present in the proximity of the outermost circumference of cell 5E of base station 3E, channel 4 is used for communication between the mobile station and base station 3E.

In this manner, as long as the allocation is realized in accordance with the same order at each base station, the distance between one base station and one mobile station is automatically leveled to an approximately equal value for each channel, and individual channels are allocated at minimum necessary distances such as D1 to D4 for simultaneous use (hereinafter referred as reuse) corresponding to the distances (R1 to R4) between the base stations and the mobile stations as seen in FIG. 14. As a result, the average reuse distance is reduced compared with that of fixed channel allocation. Consequently, a greater number of subscribers can be accommodated in each service area.

In the conventional channel allocation method of the ARP method for a mobile communications system described above, transmission power control is performed.

In the general transmission power control method, the transmission output power of the transmission side is controlled so that the carrier level on the reception side can be kept at a desired value. The desired value of the carrier level is set to a minimum value at which no quality deterioration by noise is caused. If the desired value is set in this manner, when a mobile station as a terminal is positioned closer to a base station, the transmission power can be suppressed, accordingly, the consumption of batteries provided at the mobile station can be reduced and the available service time can be increased.

If transmission power control is performed in this manner, whether a mobile station is positioned closer to or far from a base station, the carrier level is substantially fixed. Accordingly, if the algorithm of the ARP method illustrated in FIG. 1 is used as is, then it is difficult for a plurality of mobile stations whose distances to a base station are equal to reuse the same channel within the same cell in FIG. 14.

As a result, there is a drawback in that the frequency of use of channels of high selection priority degrees is not high and the traffic accommodation capacity is low.

SUMMARY OF THE INVENTION

It is an object of the present invention to provide a channel allocation method in a mobile communications system wherein the average utilization distance of the same radio channel is reduced while minimizing the average transmission power by transmission power control.

In order to attain the object described above, according to one aspect of the present invention, there is provided a channel allocation method in a mobile communications system wherein a plurality of base stations are disposed in a service area and radiocommunication is performed between the base stations and a mobile station, the channel allocation method comprising the steps of:

setting the control range of a transmission power control amount for each radio channel; and selecting, upon communication of each of the base stations with the mobile station, one of the radio channels which has a control range corresponding to the necessary transmission power control amount, and allocating the selected radio channel for communication with the mobile station.

Further, in the channel allocation method, setting a selection priority degree and a first threshold value to each of the radio channels such that the first threshold value is set at least equal or higher for the channel having higher priority degree than the lower priority channel; and allocating of any one radio channel having the first threshold value when the transmission power control amount for communication with the mobile station exceeds the first threshold value.

Further, the method may have the step of counting the frequency of interference and compulsory disconnection occurring in service corresponding for each of the first threshold values, and inhibiting the allocation of any one radio channel whose first threshold value is the least level of the transmission control power amount when the frequency corresponding to the first threshold value becomes higher than a predetermined value.

The channel allocation method for a mobile communications system may have the steps of setting a second threshold value for each of the radio channels, starting to switch a radio channel in use to another available channel when the average transmission power control amount within a fixed time in service becomes lower than the second threshold value.

The channel allocation method for a mobile communications system may have the further steps of: setting a third threshold value for each of the radio channels; and starting to switch a radio channel in use to another available channel when the average transmission power control amount within a fixed time in service becomes higher than the third threshold value.

The channel allocation method for a mobile communications system may have the further step of: switching a radio channel in use only to another free radio channel within the same time-division multiplexed carrier frequency in which at least one radio channel is accommodated.

The channel allocation method for a mobile communications system may have the further steps of: varying the first threshold value in response to the average transmission power control amount within a fixed time; varying the second threshold value in response to the average transmission power control amount within a fixed time; varying the third threshold value in response to the average transmission power control amount within a fixed time; varying the second threshold value also in response to the number of times the transmission power control amount becomes lower than the second threshold value within a fixed time; and varying the third threshold value in response to the number of times the transmission power control amount becomes lower than the third threshold value within a fixed time.

It is another object of the present invention to provide a mobile communications system to which any of the channel allocation methods is applied. To accomplish the object described above, a mobile communications system according to the present invention, wherein a plurality of base stations are disposed in a service area and radiocommunication is performed between the base stations and a mobile station, the system comprising in each base stations: means for setting and registering a control range of a transmission power control amount for each radio channels; and means of selecting, upon communications with the mobile station, one radio channel having a necessary transmission power control amount and allocating the selected radio channel for communication to the mobile station.

The mobile communications system may further comprise means for providing a selection priority degree and registering a first threshold value to each of the radio channels such that the first threshold value is set at least equal to or higher for the channel having higher priority degree than the lower priority channel; and means for allocating one radio channel having the first threshold value when the transmission power control amount for the communication with the mobile station exceeds the first threshold value.

The mobile communications system may further comprise means for counting the frequency of interference and compulsory disconnection occurring in service corresponding for each of the first threshold value; and means for inhabiting the allocation of radio channel whose first threshold value is the least level of the transmission power control amount when the frequency corresponding to the first threshold value becomes higher than a predetermined value.

The communications system may further comprise means for setting and registering a second threshold value for each of the radio channels, and means for starting to switch a radio channel in use to another available channel when the average transmission power control amount becomes lower than the second threshold value within a fixed time in service.

The mobile communications system may further comprise means for setting a third threshold value for each of the radio channels, and means for starting to switch a radio channel in use to another available channel when the average transmission power control amount becomes higher than the third threshold value within a fixed time in service.

The mobile communications system may further comprise: means for switching a radio channel in use only to another free radio channel within the same time-division multiplexed carrier frequency in which at least one radio channel is accommodated; means for varying the first threshold value in response to an average transmission power control amount within a fixed time;

means for varying the second threshold value in response to the average transmission power control amount within a fixed time;

means for varying the third threshold value in response to the average transmission power control amount within a fixed time;

means for varying the second threshold value in response to the number of times the transmission power control amount becomes lower than the second threshold value within a fixed time; or means for varying the third threshold value in response to a number of times the transmission power control amount becomes lower than the third threshold value within a fixed time.

BRIEF DESCRIPTION OF THE DRAWINGS

FIG. 13 is a flow chart illustrating a tenth embodiment of the present invention; and FIG. 14 is a diagrammatic view illustrating the relationship among channel numbers, mobile stations and base stations shown in FIG. 1.

DESCRIPTION OF THE PREFERRED EMBODIMENT

An embodiment of the present invention is described below with reference to the drawings.

Figure 1:
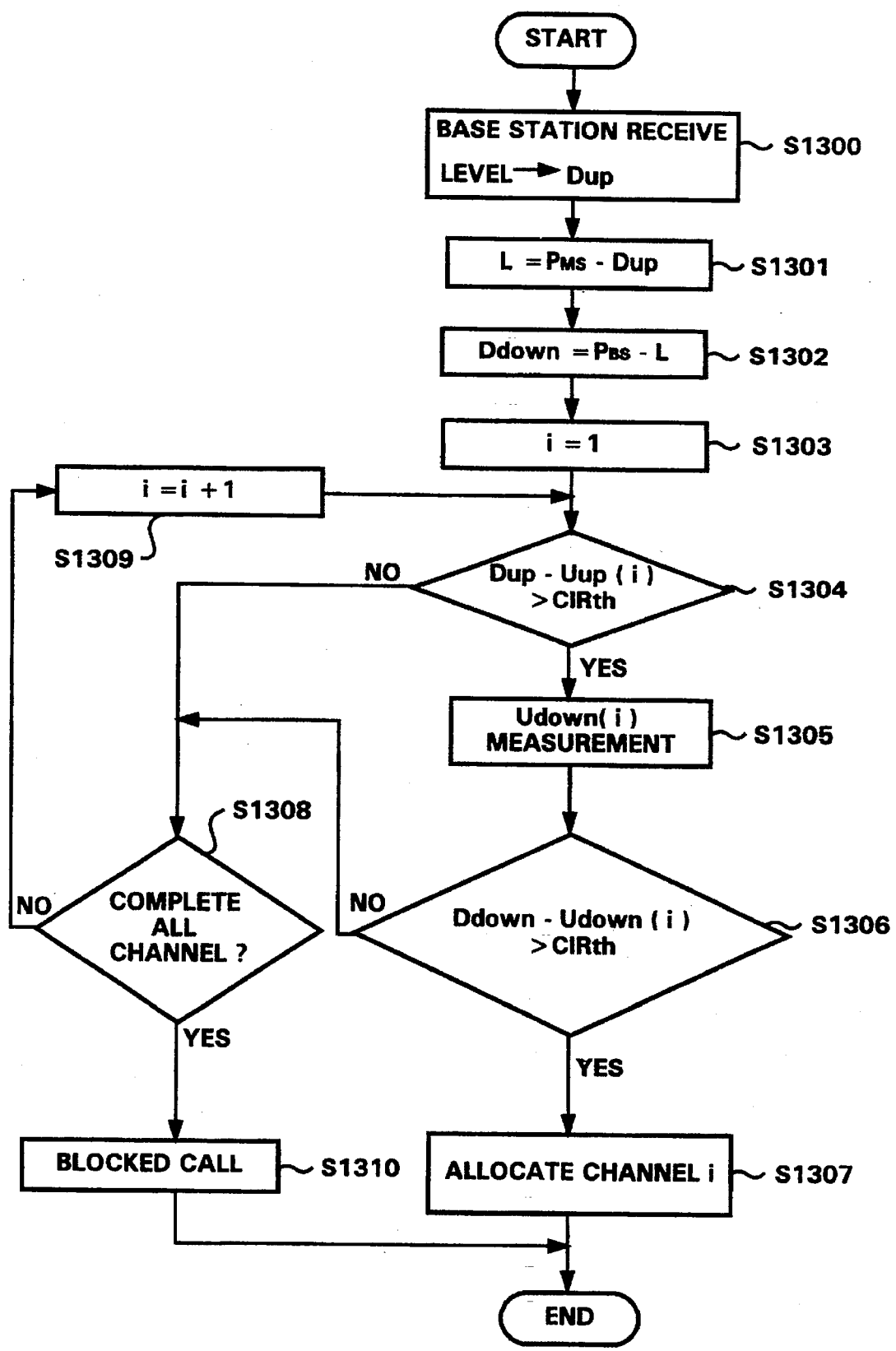
FIG. 1 is a flow chart illustrating an example of a conventional channel allocation method for a mobile communications system of the type described above.
Figure 2:
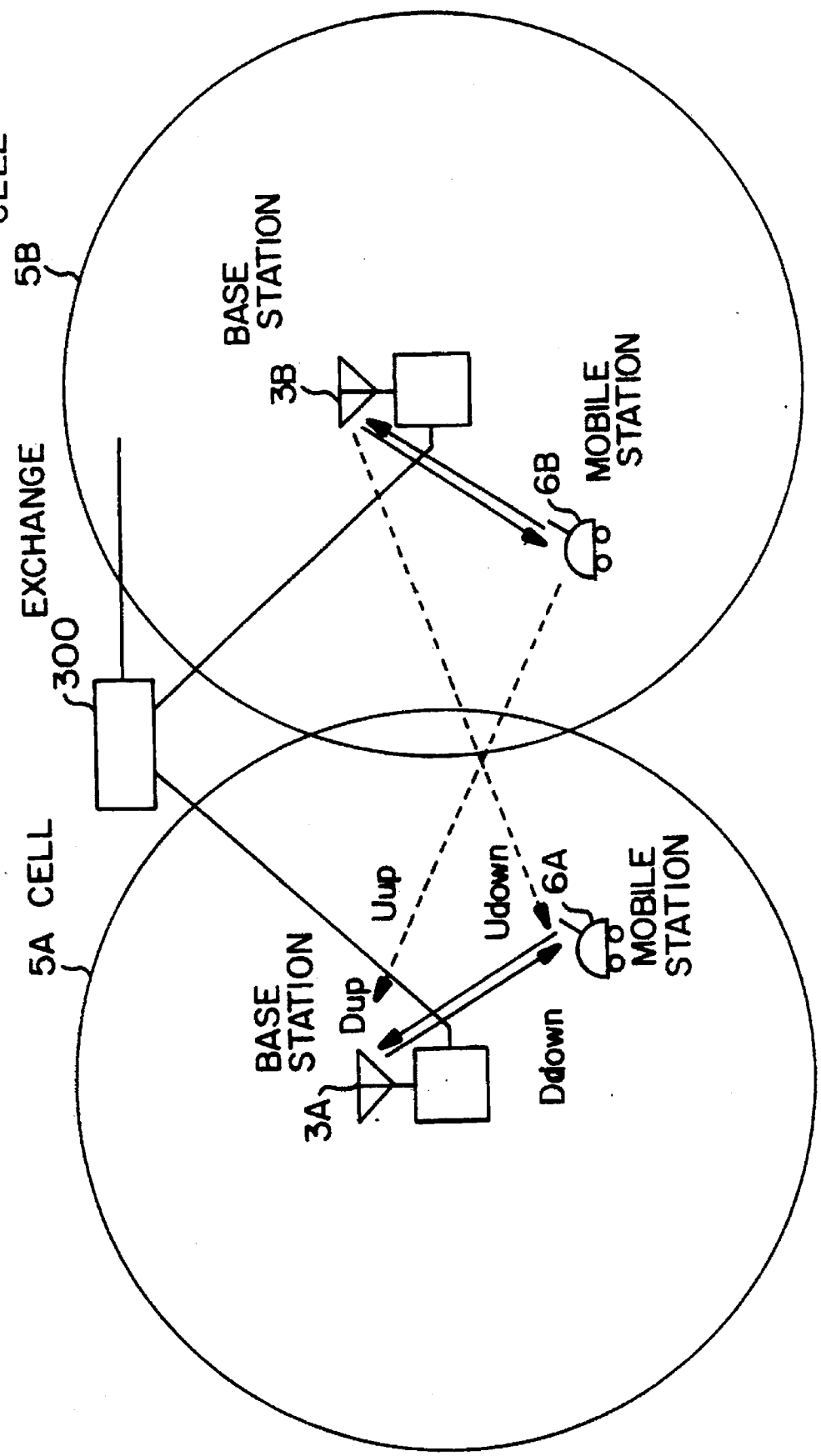
FIG. 2 is a block diagram showing an example of a typical connection of a mobile communications system for which the channel allocation method for a mobile communications system of the present invention is applied.

FIG. 2 is a diagrammatic view of an embodiment of a mobile communications system to which the channel allocation method of the present invention is applied.

The mobile communications system includes exchange 300, base stations 3A and 3B and a plurality of other base stations not shown and all connected to exchange 300, and mobile stations 6A and 6B and a plurality of other mobile stations not shown. Base station 3A and base station 3B are provided in cell 5A and cell 5B, respectively.

Reference characters $D_{up}$, $U_{vup}$, $D_{down}$ and $U_{down}$ denote the reverse-link carrier level at base station 3A, the reverse-link interference wave level at base station 3A, the forward-link carrier level at mobile station 6A, and the forward-link interference wave level at mobile station 6A, respectively.

When a call origination request occurs from mobile station 6A in the cell of base station 3A and when dynamic channel allocation is attempted, it is necessary to select a channel whose reverse-link carrier-to-interference ratio ($D_{up}$–$U_{up}$) at base station 3A and forward-link carrier-to-interference ratio ($D_{down}$–$U_{down}$) have levels higher than the required level.

Figure 3:
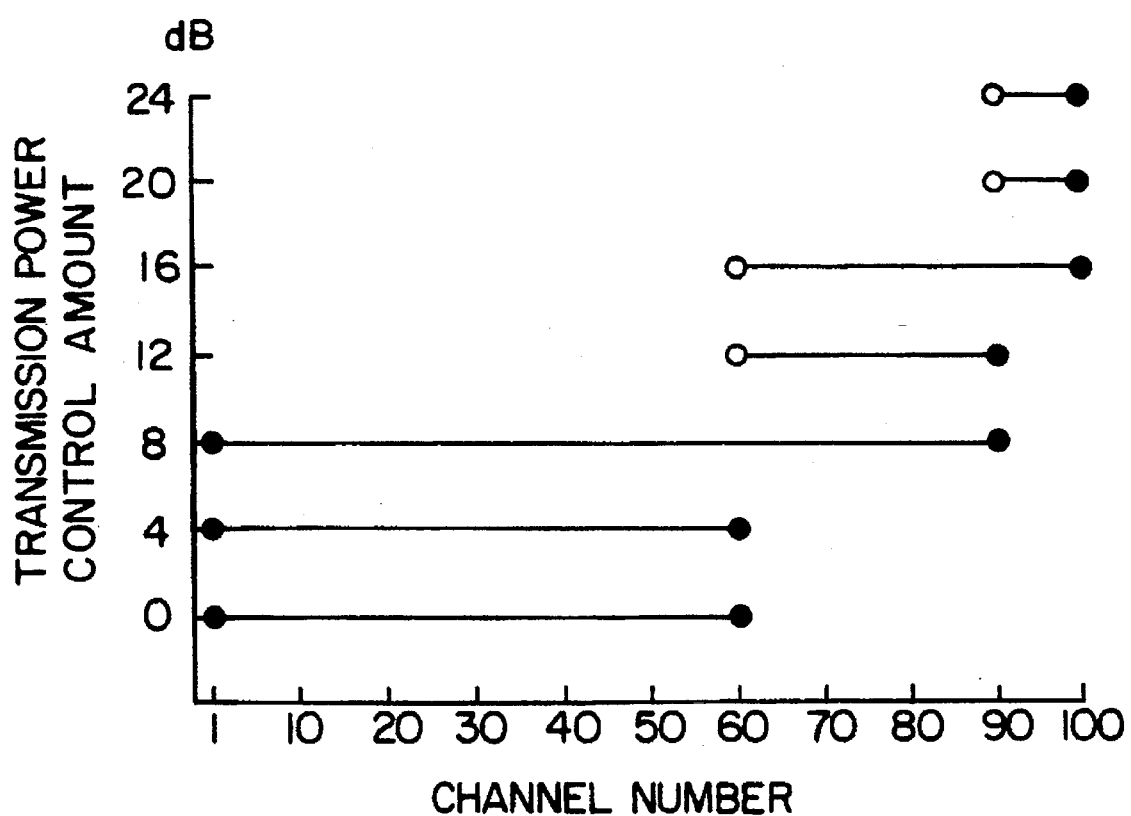
FIG. 3 is a diagrammatic view illustrating an example of radio channel numbers and permissible transmission power control amounts.

FIG. 3 is a diagrammatic view illustrating the relationship between the transmission power control amount and the channel number in an example of the control range of the transmission power control amount set for each channel and applied to the channel allocation method for a mobile communications system of the present invention.

Referring to FIG. 3, the transmission power level on the mobile station side can be controlled with a step of 4 dB for each channel, and the ordinate indicates the transmission power control amount (range within which control is possible) of the mobile station mentioned above while the abscissa indicates the channel number to which the transmission power control amount is applicable.

It is assumed that the control ranges are set for the reverse-link (mobile station to base station). Although control ranges can be set also for the forward-link, they are not limited here in the embodiments described hereinafter.

The total number of channels available to the system is 100, and the channels are divided into three groups of 60 channels, 30 channels and 10 channels. The control ranges of the transmission power control amounts of the first, second and third groups are set at 0 dB to 8 dB, 8 dB to 16 dB, and 16 dB to 24 dB, respectively.

In particular, in FIG. 3, it is shown that channels which are numbered from 1 to 60 and belong to the first group can have transmission power control amounts of 0 dB, 4 dB or 8 dB, and channels whose numbers are from 61 to 90 in the second group can have transmission power control amount of 8 dB, 12 dB or 16 dB.

Further, it is shown that channels whose channel numbers are from 91 to 100 in the third group can have transmission power control amounts of 16 dB, 20 dB or 24 dB.

Accordingly, each of the channels which, for example, belong to the third group and have channel number of 91 to 100 can be used only when the transmission power control amount falls within the range of 16 dB to 24 dB.

Figure 4A:
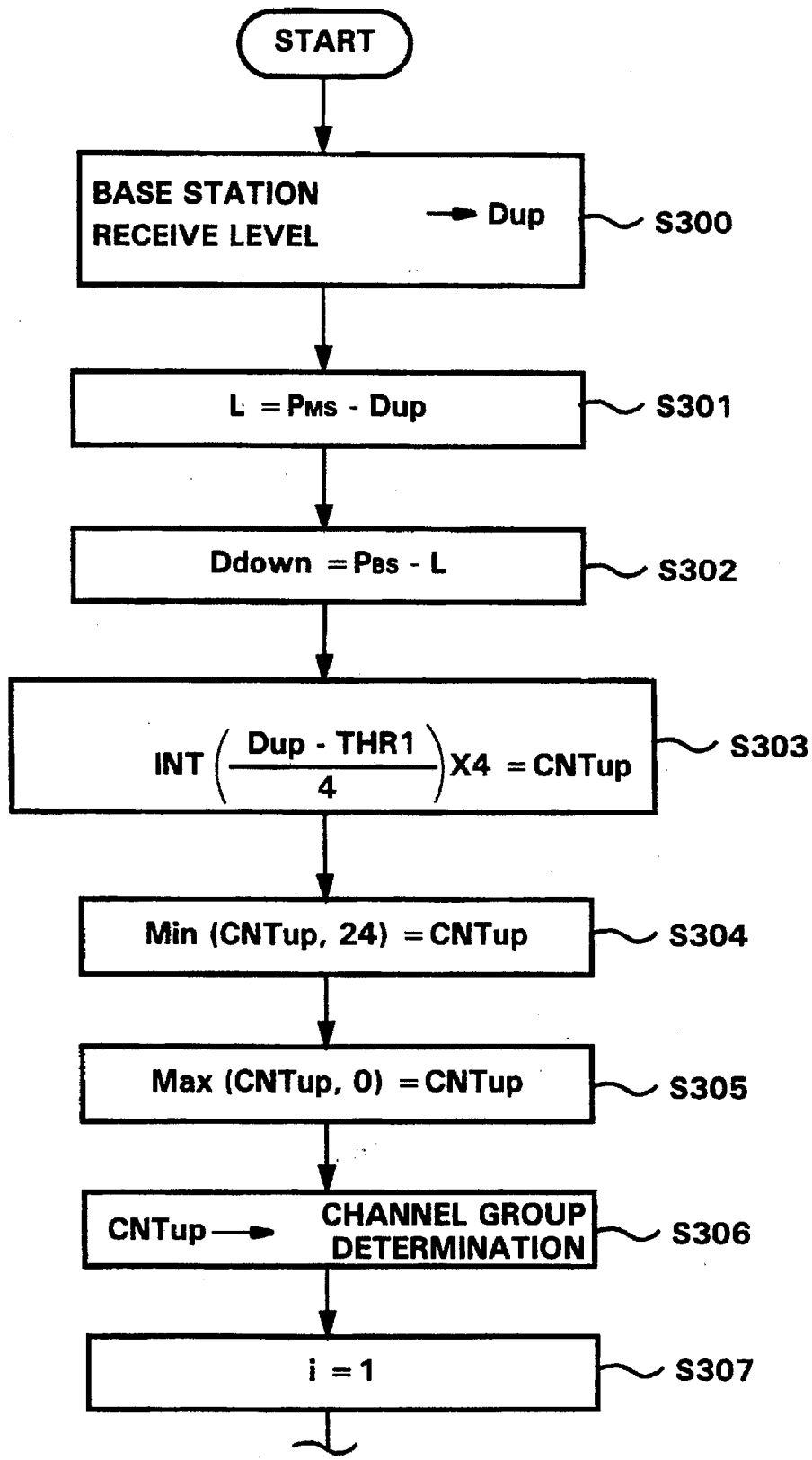
FIG. 4 is a flow chart illustrating a first operational embodiment of the channel allocation method for a mobile communications system of the present invention.
Figure 4B:
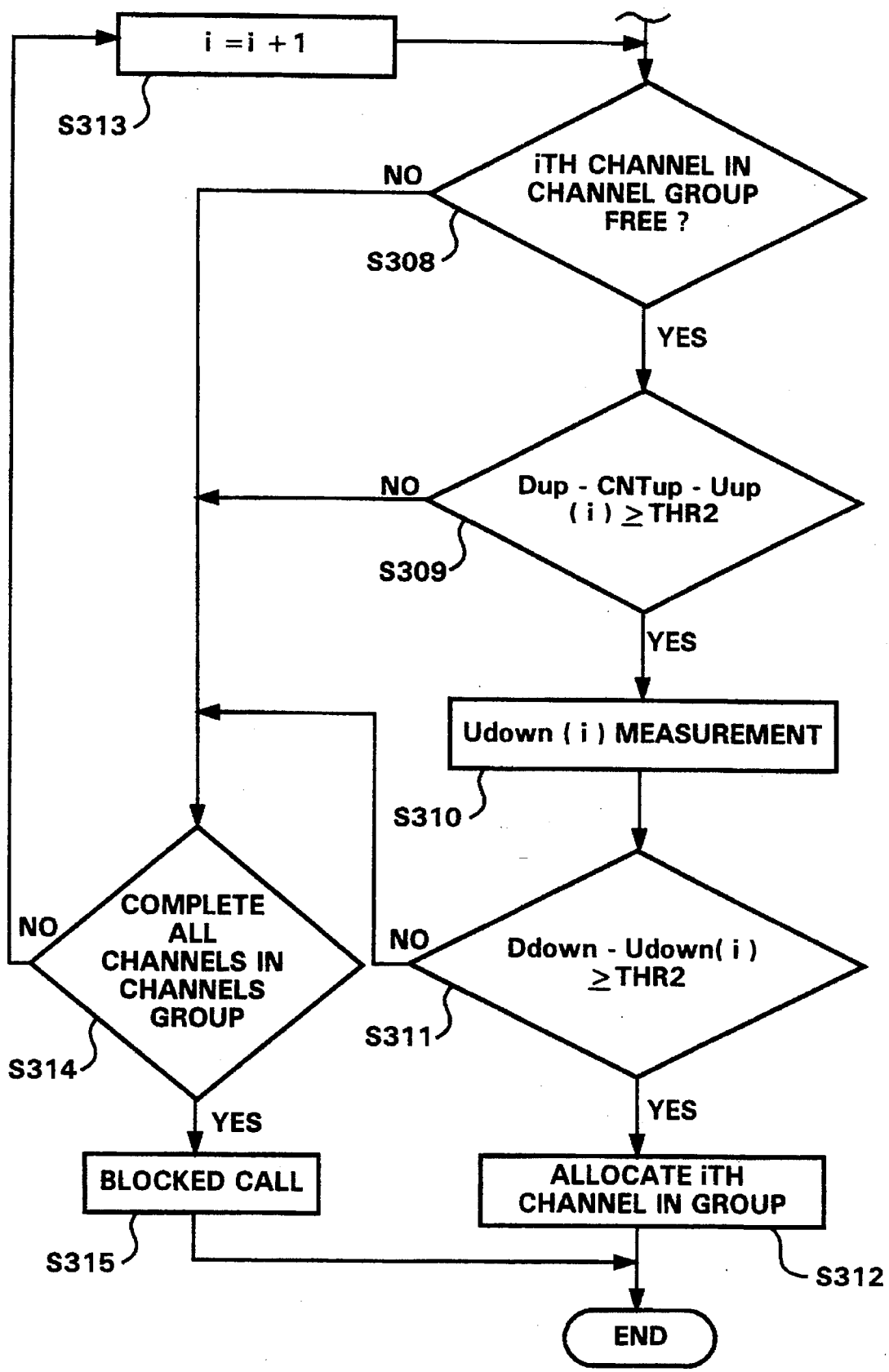

FIG. 4 is a flow chart illustrating control of the base station to which the channel allocation method of the first embodiment of the present invention is applied.

A base station (for example, base station 3A in FIG. 2) periodically receives and stores interference wave level Uup(i) of free channel i (i=1 to n, n is the maximum channel number available with the system).

Meanwhile, it is assumed that $P_{MS}$ which represents the maximum transmission power level of a mobile station (for example, mobile station 6A in FIG. 2), and $P_{BS}$, which is the maximum transmission power level of base station 3A, are known.

In the transmission power control, the procedure of adjusting the receive level toward a desired value (THR1) is performed only for the reverse-link, and the range of control is as illustrated in FIG. 3.

When a call origination request occurs, the base station stores the receive level of a request-for call origination signal (when the call is originated from the mobile station) or a call response signal (when the call arrives at the mobile station) received through a control channel as Dup which represents the reverse-link carrier level (S300).

Next, the value obtained by subtracting Dup from $P_{MS}$ is set as the propagation loss (hereinafter abbreviated to L) between the base station (3A) and the mobile station (6A) (S301).

Since the reversibility of radio propagation between the reverse-link and the forward-link and propagation loss L is considered equal, L is subtracted from $P_{BS}$ to predict forward-link carrier level Ddown at mobile station 6A (S302).

Thereafter, the value obtained by subtracting receive level desired value THR1 from reverse-link carrier level Dup is quantized into a value of 4 dB step, with which actual control can be performed, to determine control amount CNTup of the transmission power (S303).

When CNTup is higher than the maximum transmission power control amount of 24 dB, CNTup is set to CNTup=24 dB (S304).

In contrast, when CNTup is lower than 0 dB, CNTup is set to 0 dB (S305).

After the value of CNTup is determined in this manner, an available channel group is determined with reference to FIG. 3 (S306).

When, for example, CNTup=12 dB, the channel numbers of the available channel group are 61 to 90 from FIG. 3.

On the other hand, when CNTup=16 dB, the channel numbers of the available channel group are 61 to 100 from FIG. 3.

Thereafter, channel number i for identification of a channel is set to 1 (S307), and it is checked whether the first channel in the available channel group is free (S308).

When the first channel is free, the value (reverse-link CIR) obtained by subtracting CNTup and reverse-link interference wave level Uup(1) of channel 1 from Dup is compared with the required value (THR2) for the CIR (S309).

When the reverse-link CIR is equal to or higher than THR2, the base station instructs the mobile station to measure forward-link interference wave level Udown(1) of channel 1 and receives the result of measurement from the mobile station (S310).

The base station then compares the value obtained by subtracting Udown(1) from Ddown, that is, compares the forward-link CIR with THR2 (S311). When the result of comparison reveals that the forward-link CIR is equal to or higher than THR2, channel 1 is allocated to the call request (S312). On the contrary, when the reverse-link CIR or the forward-link CIR of channel 1 is lower than THR2, channel number 1 is incremented by one to select next channel 2 (S313); and thereafter, steps S308 to S311 are repeated in a similar manner to perform determination of the interference condition.

When performing the determination until final channel n (S314), and no available channel is found, then the call is blocked (S315).

Figure 5:
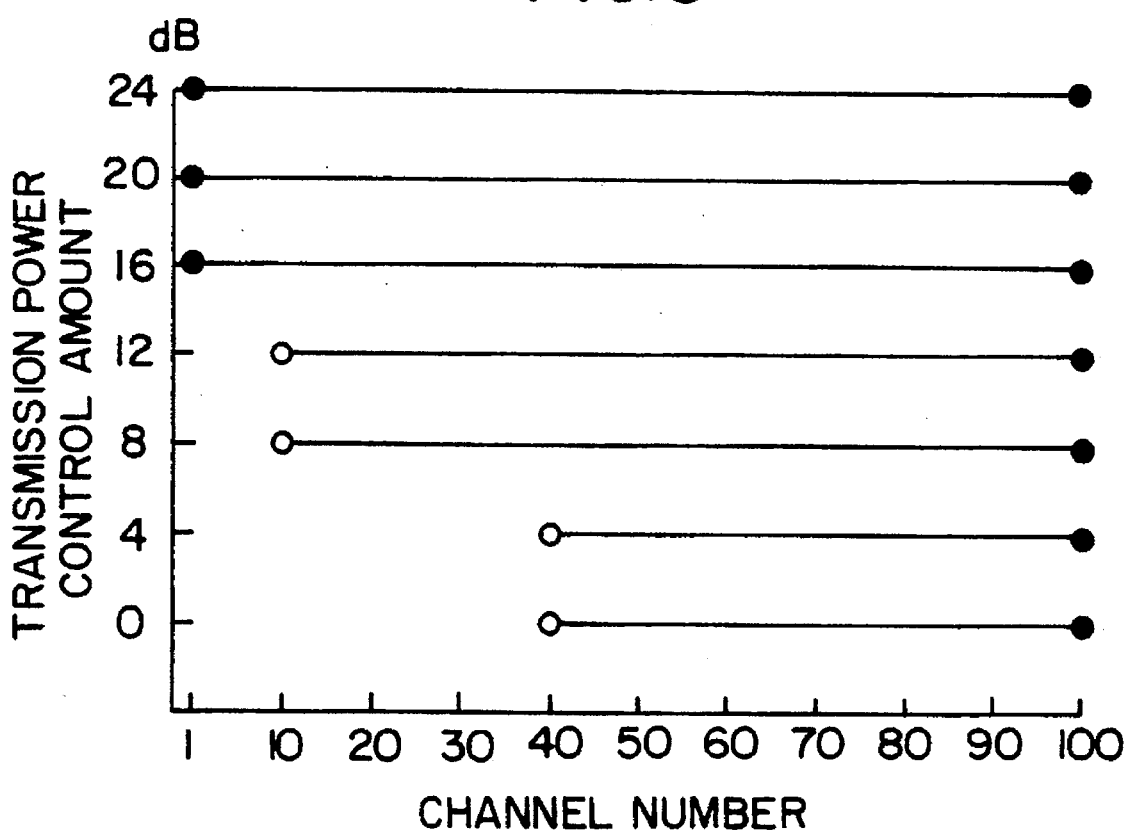
FIG. 5 is a flow chart illustrating a second embodiment the present invention.
Figure 6B:
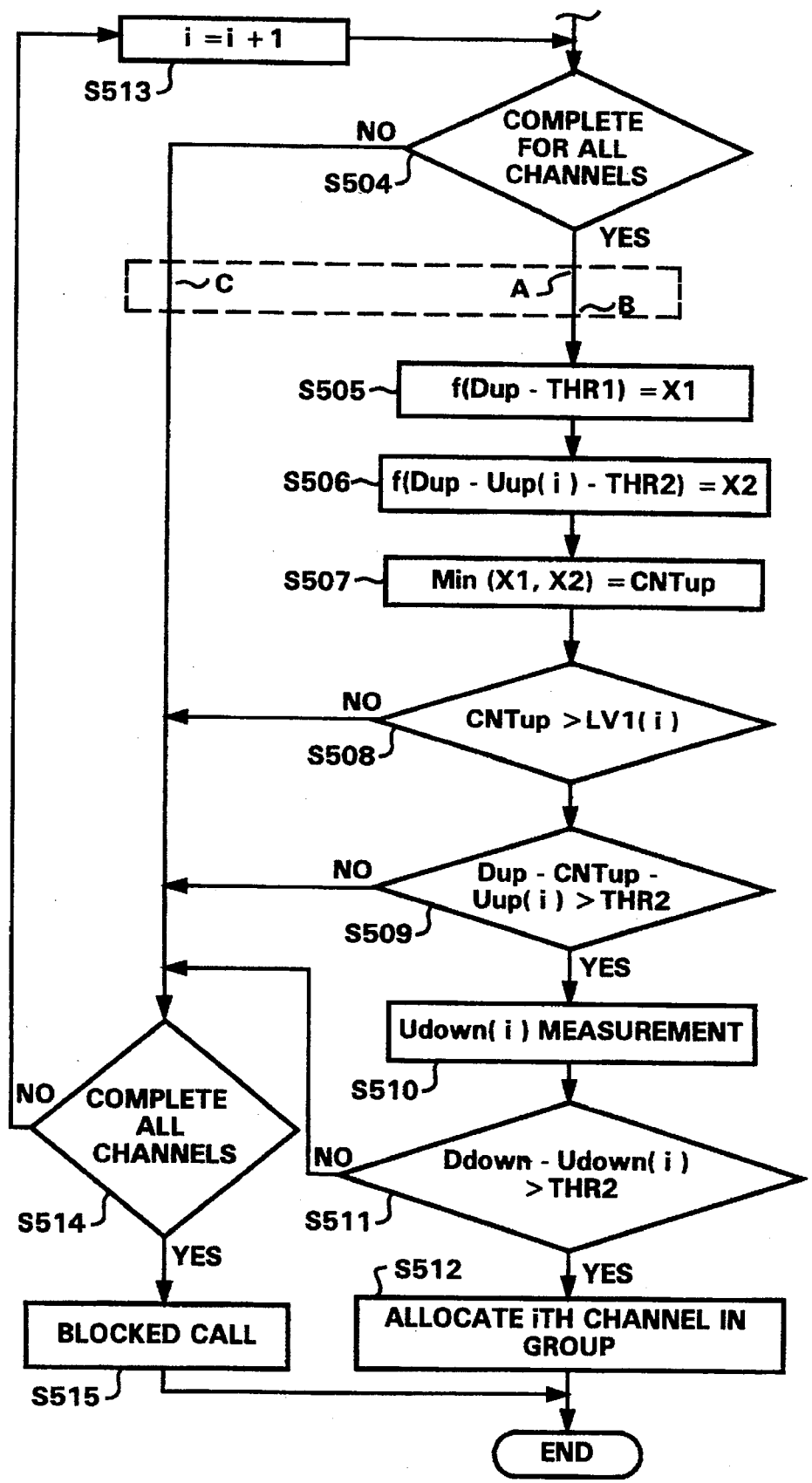
FIG. 6 is a flow chart illustrating a third embodiment.

FIG. 5 is a diagrammatic view illustrating the relationship between the control ranges of the transmission power control amount set for individual radio channels and the channel numbers, which is used when a second embodiment of the present invention which is hereinafter described with reference to FIG. 6 is applied.

The transmission power control ranges are set for the reverse-link (mobile station to base station). Although control ranges can be set also for the forward-link, they are not limited here.

Assuming that the total number of channels available with the system is 100 and that the selection priority degree of a channel is provided in order from lower number to higher channel number. The channels are divided into three groups, that is, a first group of 10 channels having channel numbers 1 to 10, a second group of 30 channels having channel numbers 11 to 40, and a third group of 60 channels having channel numbers 41 to 100. The control ranges of the transmission power control amount of the first, second and third groups are all set at 4 dB intervals from 16 dB to 24 dB, from 8 dB to 24 dB, and from 0 dB to 24 dB, respectively.

Accordingly, the channels of the first group which have channel numbers 1 to 10 can have a transmission power control amount equal to or higher than 16 DB; the channels of the second group which have channel numbers 11 to 40 can have a transmission power control amount equal to or higher than 8 dB; and the channels of the third group which have channel numbers 41 to 100 can have a transmission power control amount equal to or higher than 0 dB.

Meanwhile, when any of the channels of the first group which have channel numbers 1 to 10 is applied, the minimum transmission power control amount is 16 dB; when any of the channels of the second group which have channel numbers 11 to 40 is applied, the minimum transmission power control amount is 8 dB; and when any of the channels of the third group which have channel numbers 41 to 100 is applied, the minimum transmission power control amount is 0 dB.

FIG. 6 is a flow chart illustrating a second embodiment of application different from that described above with reference to FIG. 4 which is applied to the channel allocation method for a mobile communications system of the present invention.

Base station 3A in FIG. 2 periodically receives and stores an interference wave level Uup(i) of a free channel i (i=1 to n, n is the maximum number of channels available with the base station).

Meanwhile, it is assumed that $P_{MS}$ which represents the maximum transmission power level of mobile station 6A in FIG. 2, and $P_{BS}$, which is the maximum transmission power level of base station 3A, are known.

In transmission power control, control is performed only for the reverse-link in such a way that the receive level is controlled to maintain higher than desired value THR1 and CIR is kept higher than THR2, and the range of control is such illustrated in FIG. 5.

When a call request occurs, the base station stores the receive level of a request for call origination signal (when the call is originated from the mobile station) or a call response signal (when the call arrives at the mobile station) received through the control channel as Dup which represents the reverse-link carrier level (S500).

Next, the value obtained by subtracting Dup from $P_{MS}$ is set as a propagation loss (hereinafter abbreviated to L) between the base station and the mobile station (S501). Since the reversibility stands between the reverse-link and the forward-link and propagation loss L is considered equal between them, L is subtracted from $P_{BS}$ to predict Ddown which is the forward-link carrier level at the mobile station (S502).

Thereafter, assuming that channel number i is set to 1 (S503), it is checked whether the first channel in the channel group is free (S504).

When the first channel is free, transmission power control amount X1 with which reverse-link carrier level Dup is adjusted to receive level aimed value THR1 is first determined. To this end, the value obtained by subtracting the receive level aimed value THR1 from reverse-link carrier level Dup is quantized into a value of 4 dB intervals, with which actual control can be performed to determine control amount X1 of the transmission power.

If X1 is higher than the maximum transmission power control amount of 24 dB, X1 is set to X1=24 dB, but when X1 is lower than 0 dB, X1 is set to X1=0 dB.

In FIG. 6, the series of processes described above is represented by function f (S505).

Next, transmission power control amount X2 with which the reverse-link CIR is adjusted to a required value THR2 is determined. For this purpose X2 is obtained by quantizing a value which is obtained by subtracting reverse-link interference wave level Uup(1) and required value THR2 for the CIR from reverse-link carrier level Dup into a value of 4 dB intervals. Further, when X2 is higher than the maximum transmission power control amount of 24 dB, X2 is set to X2=24 dB, but when X2 is lower than 0 dB, X2 is set to X2=0 dB.

In FIG. 6, the series of processes described above is represented by function f (S506).

The smaller of X1 and X2 determined in this manner is set as actual transmission power control amount CNTup (S507).

CNTup is then compared with initial minimum transmission power control amount LV1(1) when channel 1 is selected to be allocated (S508).

If CNTup is equal to or higher than LV1(1), then the value obtained by subtracting CNTup and reverse-link interference wave level Uup (1) of channel 1 (that is, the reverse-link CIR after transmission power control) from Dup is compared with required value THR2 for the CIR (S509).

When the reverse-link CIR is equal to or higher than THR2, base station 3A instructs mobile station 6A of measurement of forward-link interference level Udown(1) of channel 1 and receives the result from mobile station 6A (S510).

The value (that is, the forward-link CIR) obtained by subtracting Udown(1) from Ddown is compared with THR2 (S511).

If the comparison proves that the forward-link CIR is also equal to or higher than THR2, channel 1 is allocated to the call request (S512).

If channel 1 is busy, when CNTup is lower than LV1(1) or when the reverse-link CIR or the forward-link CIR is smaller than THR2, parameter i is incremented by one to select next channel 2 (S513), and steps S504 to S511 are repeated n a similar manner to check whether channel 2 can be used.

When the determination is performed for final channel n (S514), if no available channel is found, then the call is blocked (S515).

Figure 7:
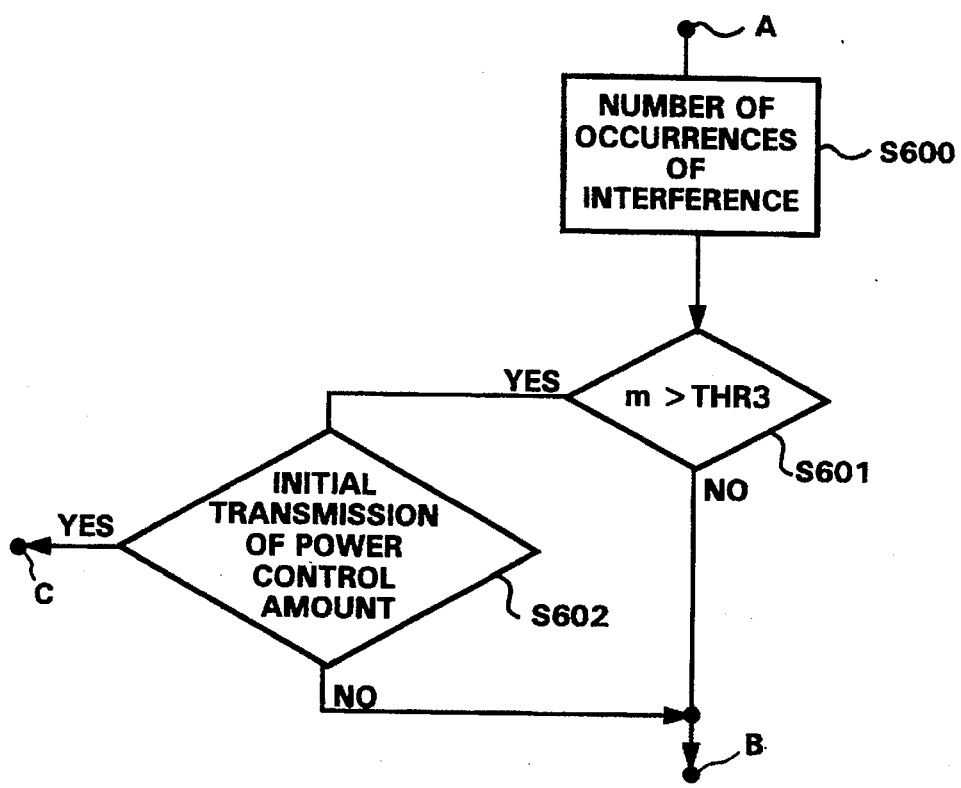
FIG. 7 i a partial flow chart illustrating a different portion of a fourth embodiment.

FIG. 7 is a partial flow chart illustrating a third embodiment of the present invention different from those of FIGS. 4 and 6.

In the present application embodiment a channel allocation method for a mobile communications system is provided by the application embodiment of FIG. 6 to which the steps of FIG. 7 are added.

In particular, points A, B and C shown in FIG. 7 are related to points A, B and C shown in FIG. 6, respectively.

The control range of transmission power control is as illustrated in FIG. 5.

When the result of the check to determine whether the ith channel is free (S504) described hereinabove with reference to FIG. 6 proves that the channel is free, the control sequence advances to S600 shown in FIG. 6. Base station 3A measures the number of occurrences of interference within an arbitrary time (T1) in all busy channels, that is, the number of times by which the CIR becomes lower than the required value during service and sets the value as m (S600).

Next, base station 3A compares interference occurrence number m with threshold value THR3 (S601).

Here, if interference occurrence number m of the ith channel is equal to or higher than threshold value THR3, then base station 3A inhibits new allocation of any channel whose minimum transmission power control amount at allocation is the same as the channel compared with THR3 (S602).

By way of the example of FIG. 5, the channel number of a channel with which the minimum transmission power control amount at allocation is the minimum level (0 dB) ranges from 41 to 100, and it is prevented from allocating any of those channels to a new call in a same condition.

When interference occurrence number m is lower than threshold value THR3 at S601, the control sequence advances to S505 shown in FIG. 6 to permit new allocation of a channel with which the initial minimum transmission power amount is at the minimum level.

Accordingly, all channels are permitted to be allocated to a newly call. While, in the present embodiment, a newly allocatable channel is selected in accordance with the number of occurrences of interference, the compulsory disconnections occurrence number (the number of disconnection due to no replaceable channel for occurrence of interference) may be employed in place of the number of occurrences of interference.

Figure 8:
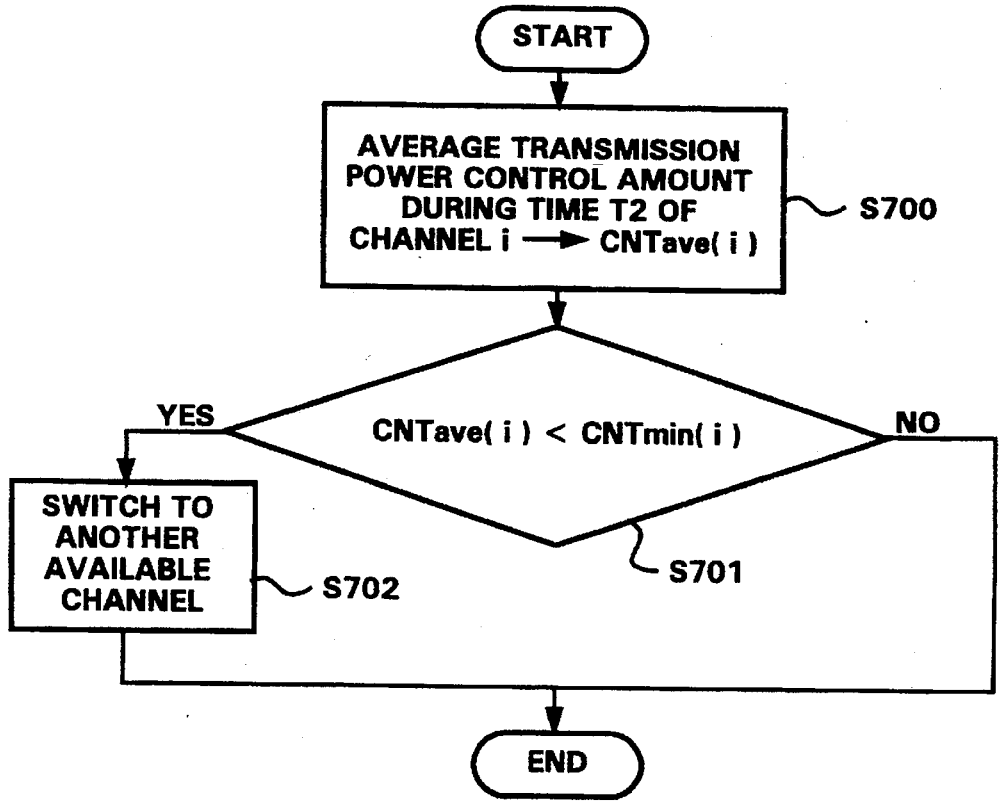
FIG. 8 is a partial flow chart illustrating a different portion of a fifth embodiment.

FIG. 8 is a partial flow chart illustrating a fourth embodiment of the channel allocation method for a mobile communications system of the present invention different from the embodiments described above.

The channel allocation method for the mobile communications system illustrated in FIG. 8 is applied to a channel in service which has been allocated by the second embodiment with reference to FIG. 6.

CNTmin(i) which represents the in-service minimum transmission power control amount is set for each channel. The values of CNTmin(i) are set 4 dB lower than the values of LV1(i) which represent the initial minimum transmission power control amount. In particular, the in-service minimum transmission power control amounts of channels 1 to 10, 11 to 40, and 41 to 100 are 12 dB, 4 dB, and −4 dB, respectively.

Base station 3A in FIG. 2 measures the average value of the transmission power control amount within an arbitrary time (T2) for a call in service in a channel having channel number i and sets the value as CNTave(i) (S700).

Base station 3A then compares average transmission power control amount CNTave(i) and in-service minimum transmission power control amount CNTmin(i) of the channel (S701).

Here, if CNTave(i) is lower than CNTmin(i), the base station determines that it is not suitable to use the channel as is, and starts switching control to another channel (S702).

If CNTave(i) is equal to or higher than CNTmin(i) at S701, the call is continued in service by way of channel i as is.

Figure 9:
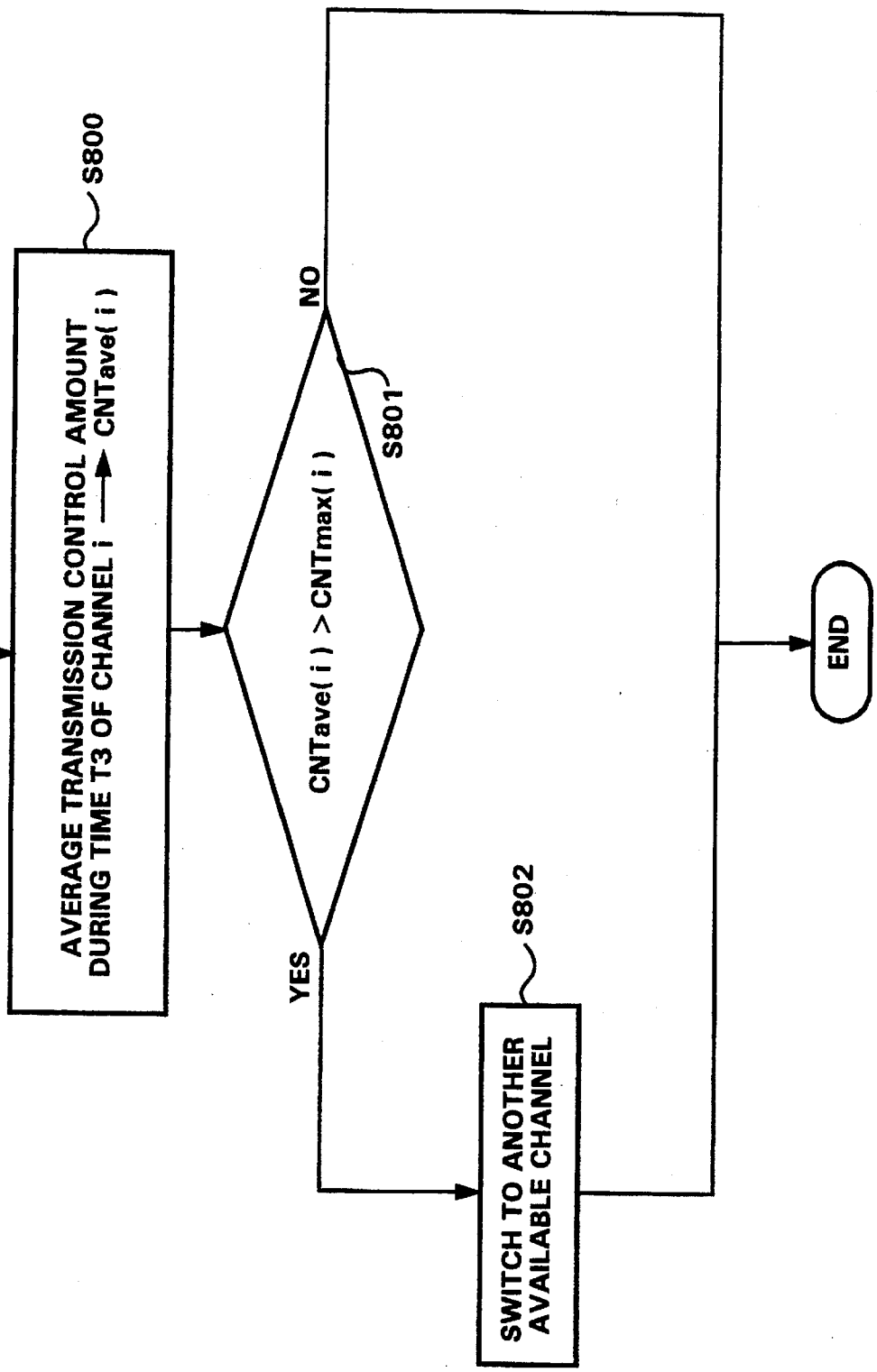
FIG. 9 is a partial flow chart illustrating a different portion of a sixth embodiment.

FIG. 9 is a partial flow chart of a fifth embodiment of the present invention which is different from the methods described above which is applied to the system of FIG. 2.

The present control is performed for a channel in service which has been allocated by the method described hereinabove with reference to FIG. 6.

CNTmax(i) which represents the in-service maximum transmission power control amount is set for each channel.

The values of CNTmax(i) are set 8 dB higher than the values of LV1(i) which represents the initial minimum transmission power control amount. In particular, the in-service minimum transmission power control amounts of channels 1 to 10, 11 to 40, and 41 to 100 are 24 dB, 16 dB, and 8 dB; respectively.

Base station 3A measures the average value of the transmission power control amount within an arbitrary time (T3) for a call in service in a channel having channel number i and sets the value as CNTave(i) (S800).

Base station 3A then compares average transmission power control amount CNTave(i) and in-service maximum transmission power control amount CNTmax(i) of the channel (S801).

Here, if CNTave(i) is higher than CNTmax(i), base station 3A determines that it is not suitable to use the channel as is, and starts switching control to another channel (S802).

If CNTave(i) is equal to or lower than CNTmax(i) at S801, the call is continued in service by way of channel i as is.

Figure 10:
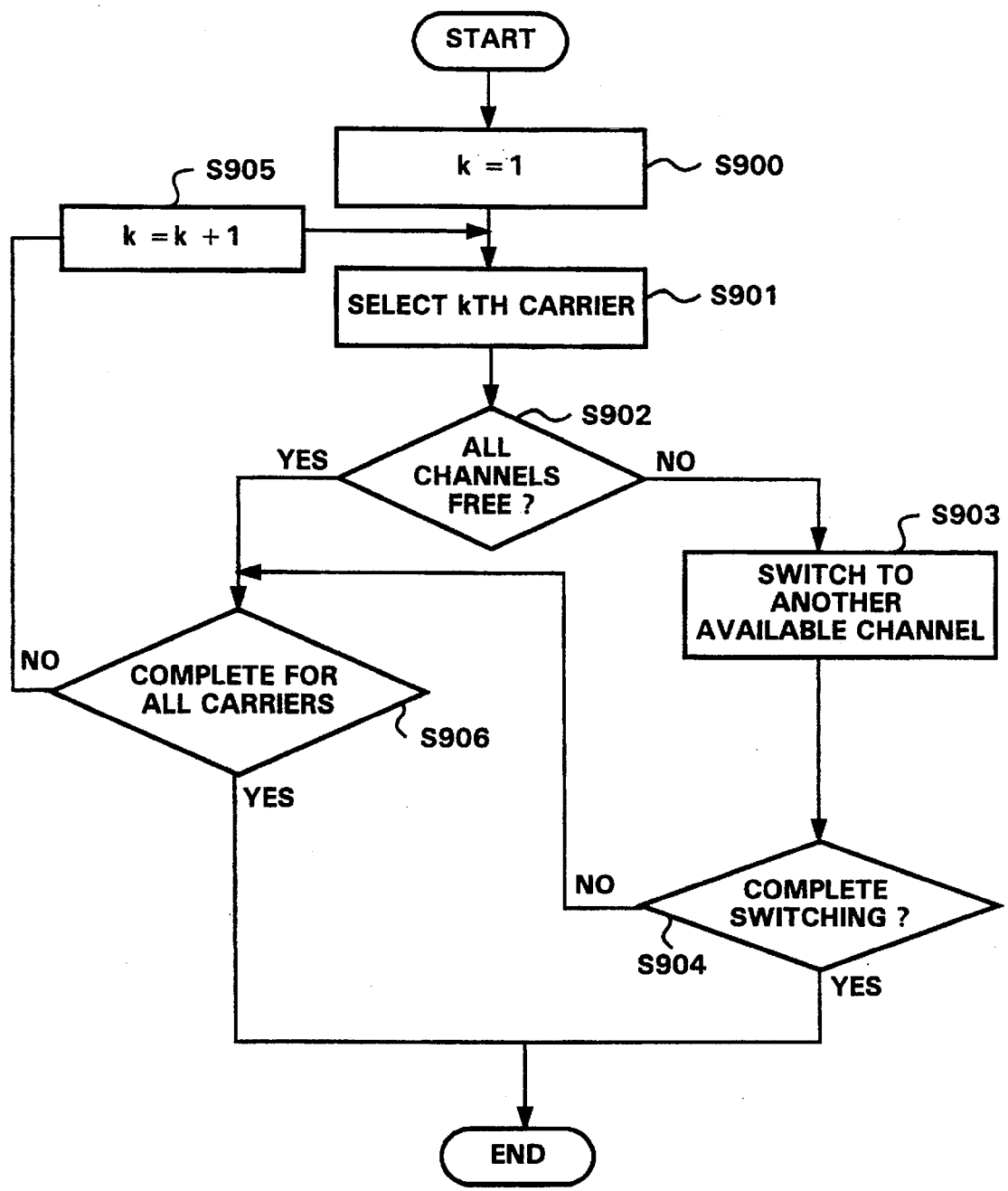
FIG. 10 is a flow chart illustrating a seventh embodiment of the present invention.

FIG. 10 is a flow chart of a sixth embodiment illustrating operation when the channel allocation method for a mobile communications system of the present invention which is different from the methods described above is applied to the system shown in FIG. 2.

In the present method, S702 or S802 at which the channel switching control in the channel allocation method described hereinabove with reference to FIG. 8 or 9 is replaced by the steps shown in FIG. 10.

The channel allocation method in FIG. 10 is employed in a mobile communications system of the TDMA (time division multiplex accessing) system wherein a plurality of channels are time-division multiplexed on the same carrier frequency.

After channel switching is started in the channel allocation method illustrated in FIG. 8 or 9, base station 3A shown in FIG. 2 sets parameter k for identification of the carrier frequency, that is, the channel number, to 1 (S900), and selects carrier frequency 1 corresponding to channel number 1 in the available carrier frequency group, and thereafter checks the use conditions of all the channels on the carrier frequency.

When more than one channel is used, switching to another free channel on carrier frequency 1 is performed (S903) and success or failure of the result of switching is determined (S904).

If the switching is successful, the control is ended immediately.

If no channel is free on carrier frequency 1, or if switching to another free channel on carrier frequency 1 has not been performed successfully, parameter k is increased one to select next carrier frequency 2 (S905), and thereafter steps S901 to S903 are repeated in a similar manner.

When the switching control is performed for the final carrier frequency, but no available channel is found (S906), then the control is ended.

Figure 11:
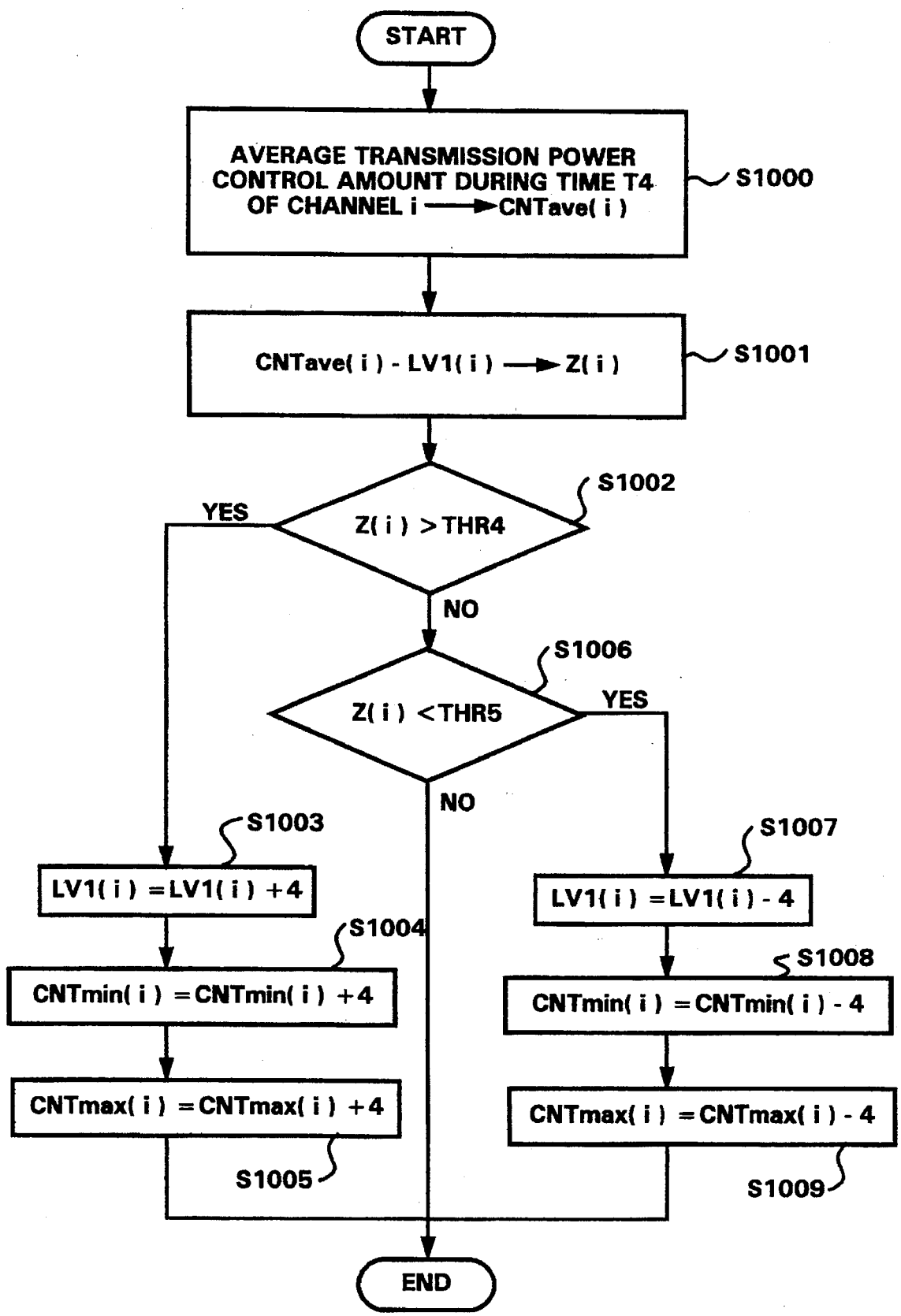
FIG. 11 is a flow chart illustrating an eighth embodiment of the present invention.

FIG. 11 is a flow chart of a seventh embodiment of the channel allocation method for a mobile communications system of the present invention.

The method of FIG. 11 is performed independently of channel allocation when the channel allocation method described hereinabove with reference to FIG. 5, 7 or 8 is applied to the system shown in FIG. 2.

It is assumed that LV1(i) representing the initial minimum transmission power control amount, CNTmin(i) representing the in-service minimum transmission power control amount and CNTmax(i) representing the in-service maximum transmission power control amount are set for each channel.

Base station 3A measures the average value of the transmission power control amount within an arbitrary time (T4) sufficiently longer than the average service time for a channel whose channel number is i, and sets the value as CNTave(i) (S1000).

Next, difference Z(i) between average transmission power control amount CNTave(i) and minimum transmission power control amount LV1(i) is calculated (S1001), and is compared with threshold value THR4(S1002).

Here, if Z(i) is higher than THR4, then the base station increases 4 dB for each of the values of initial minimum transmission power control amount LV(i), in-service minimum transmission power control amount CNTmin(i) and in-service maximum transmission power control amount CNTmax(i) of channel i and continues to use the same channel (S1003, S1004 and S1005).

If Z(i) is equal to or lower than THR4, then Z(i) is compared with threshold value THR5 (S1006).

Here, if Z(i) is lower than THR5, the base station decreases 4 dB for each of the values of initial minimum transmission power control amount LV(i), in-service minimum transmission power control amount CNTmin(i) and in-service maximum transmission power control amount CNTmax(i) of channel i, and continues to use the same channel (S1003, S1004 and S1005).

Figure 12:
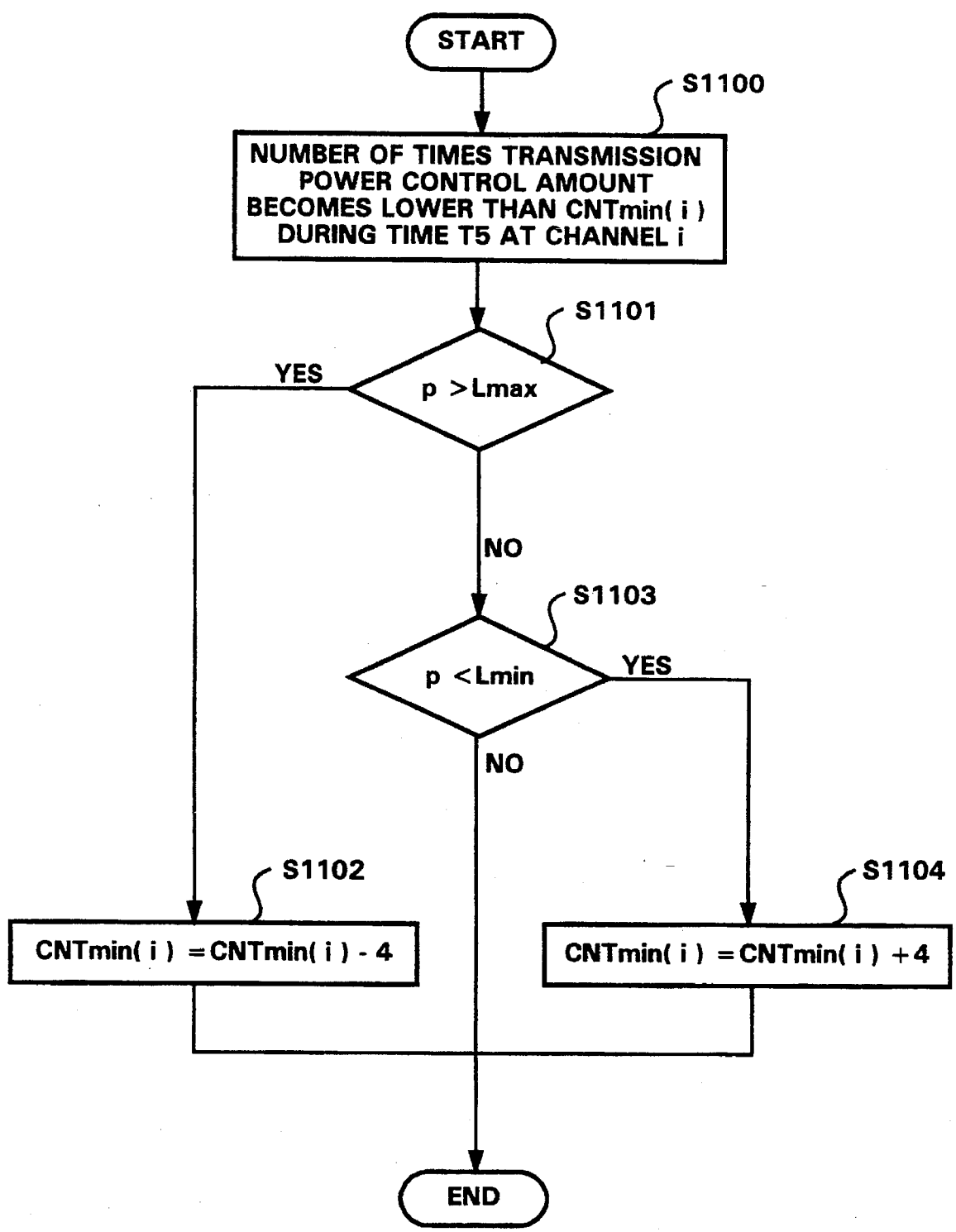
FIG. 12 is a flow chart illustrating a ninth embodiment of the present invention.

FIG. 12 is a flow chart of an eighth embodiment of the channel allocation method for a mobile communications system of the present invention which is different from the embodiments described above.

The present control is performed independently of channel allocation when the channel allocation method described hereinabove with reference to FIG. 9 is applied to the system of FIG. 2.

In-service minimum transmission power control amount CNTmin(i) is set for each channel.

Base station 3A measures the number of times by which the transmission power control amount becomes lower than in-service minimum transmission power control amount CNTmin(i) within an arbitrary time (T5) sufficiently longer than the average service time for a channel having channel number i and sets the value as p (S1100). Base station 3A then compares p and threshold value Lmax (S1101). If the comparison proves that p is higher than Lmax, base station 3A decreases the value of in-service minimum transmission power control amount CNTmin(i) of a channel having channel number i by 4 dB and continues to use the same channel (S1102).

If p is equal to or lower than Lmax, p and threshold value Lmin are compared (S1103).

If the result proves that p is lower than Lmin, then base station 3A increases in-service minimum transmission power control amount CNTmin(i) of a channel having channel number i by 4 dB and continues to use the same channel (S1104).

If p is equal to or higher than Lmin, use of the channel is continued.

FIG. 13 is a flow chart of a ninth embodiment of the channel allocation method for a mobile communications system of the present invention which is different from the embodiments described above.

The present control is performed independently of channel allocation when the channel allocation method described hereinabove with reference to FIG. 9 is applied.

In-service maximum transmission power control amount CNTmax(i) is set for each channel. Base station 3A measures the number of times by which the transmission power control amount becomes higher than in-service maximum transmission power control amount CNTmax(i) within an arbitrary time (T6) sufficiently longer than the average service time for a channel having channel number i and sets the value as q (S1200). Base station 3A then compares q and threshold value Mmax (S1201).

If the comparison proves that q is higher than Mmax, base station 3A increases the value of in-service minimum transmission power control amount CNTmax(i) of a channel having channel number i by 4 dB and continues to use the same channel (S1202).

If q is equal to or lower than Mmax, p and threshold value Mmin are compared with each other (S1203).

If the result proves that q is lower than Mmin, then base station 3A decreases in-service maximum transmission power control amount CNTmax(i) of a channel having channel number i by 4 dB and ends the control (S1204). If q is equal to or higher than Mmin, then use of the same channel is continued.

As described in detail to this point, the channel allocation method for a mobile communications system of the present invention is advantageous in that it provides a channel allocation method which is short in average reuse distance and high in frequency utilization efficiency while suppressing the average transmission power by performing transmission power control.

What is claimed is:

1. A channel allocation method in a mobile communications system in which a plurality of base stations are disposed in a service area and radio communication is performed between one of said base stations and a mobile station, said method handled by each base station comprising the steps of:

setting the control range of the transmission power control amount for each radio channel;

selecting, upon communication of each of said base stations with the mobile station, one of radio channels which has a control range corresponding to the necessary transmission power control amount, and allocating the selected radio channel for communication with the mobile station;

setting a selection priority degree and a first threshold value to each of the radio channels such that the first threshold value is set at least equal to or higher for the channel having higher priority degree than the lower priority channel; and allocating of one radio channel having the first threshold value when the transmission power control amount for the communication with the mobile station exceeds the first threshold value.

2. A channel allocation method for a mobile communications system as claimed in claim 1, wherein the method comprises further steps of:

counting the frequency of interference and compulsory disconnection occurring in service corresponding for each of the first threshold values; and inhibiting the allocation of radio channel to a mobile station whose least level of the transmission power is equal to the corresponding first threshold value when said frequency becomes higher than a predetermined value.

3. A channel allocation method for a mobile communications system as claimed in claim 1, wherein said method further comprises the step of:

setting a second threshold value for each of the radio channels; and starting to switch a radio channel in use to another available channel when the average transmission power control amount within a fixed time in service becomes lower than said second threshold value.

4. A channel allocation method for a mobile communications system as claimed in claim 3, wherein said method further comprises the step of:

switching a radio channel in use only to another free radio channel in the same time-division multiplexed carrier frequency.

5. A channel allocation method for a mobile communications system as claimed in claim 3, wherein said second threshold value is varied in response to the average transmission power control amount within a fixed time.

6. A channel allocation method for a mobile communications system as claimed in claim 3, wherein said second threshold value is varied in response to the number of times the transmission power control amount becomes lower than said second threshold value within a fixed time.

7. A channel allocation method for a mobile communications system as claimed in claim 1, wherein said method further comprises the steps of:
   setting a second threshold value for each of the radio channels; and
   starting to switch a radio channel in use to another available channel when the average transmission power control amount within a fixed time in service becomes higher than the second threshold value.

8. A channel allocation method for a mobile communications system as claimed in claim 7, wherein said method further comprises the step of:
   switching a radio channel in use only to another free radio channel in the same time-division multiplexed carrier frequency.

9. A channel allocation method for a mobile communications system as claimed in claim 7, wherein said second threshold value is varied in response to the average transmission power control amount within a fixed time.

10. A channel allocation method for a mobile communications system as claimed in claim 7, wherein said second threshold value is varied in response to the number of times the transmission power control amount becomes lower than said second threshold value within a fixed time.

11. A channel allocation method for a mobile communications system as claimed in claim 1, wherein said first threshold value is varied in response to the average transmission power control amount within a fixed time.

12. A channel allocation method for a mobile communications system in which a plurality of base stations are disposed in a service area and radio communication is performed between one of said base stations and a mobile station, said method handled by each base station comprising the steps of:
   setting the control range of the transmission power control amount for each radio channel;
   selecting, upon communication of each of said base stations with the mobile station, one of radio channels which has a control range corresponding to the necessary transmission power control amount, and allocating the selected radio channel for communication with the mobile station;
   setting a threshold value for each of the radio channels; and
   starting to switch a radio channel in use to another available channel when the average transmission power control amount within a fixed time in service becomes lower than the threshold value.

13. A channel allocation method for a mobile communications system as claimed in claim 12, wherein said method further comprises the step of:
   switching a radio channel in use only to another free radio channel in the same time-division multiplexed carrier frequency.

14. A channel allocation method for a mobile communications system as claimed in claim 12, wherein said threshold value is varied in response to the average transmission power control amount within a fixed time.

15. A channel allocation method for a mobile communications system as claimed in claim 12, wherein the threshold value is varied in response to the number of times the transmission power control amount becomes lower than said threshold value within a fixed time.

16. A channel allocation method for a mobile communications system in which a plurality of base stations are disposed in a service area and radio communication is performed between one of said base stations and a mobile station, said method handled by each base station comprising the steps of:
   setting the control range of the transmission power control amount for each radio channel;
   selecting, upon communication of each of said base stations with the mobile station, one of radio channels which has a control range corresponding to the necessary transmission power control amount, and allocating the selected radio channel for communication with the mobile station;
   setting a threshold value for each of the radio channels; and
   starting to switch a radio channel in use to another available channel when the average transmission power control amount within a fixed time in service becomes higher than the threshold value.

17. A channel allocation method for a mobile communications system as claimed in claim 16, wherein said method further comprises the step of:
   switching a radio channel in use only to another free radio channel in the same time-division multiplexed carrier frequency.

18. A channel allocation method for a mobile communications system as claimed in claim 16, wherein said threshold value is varied in response to the average transmission power control amount within a fixed time.

19. A channel allocation method for a mobile communications system as claimed in claim 16, wherein said threshold value is varied in response to the number of times the transmission power control amount becomes lower than said threshold value within a fixed time.

20. A mobile communications system wherein a plurality of base stations are disposed in a service area and radio-communication is performed between one of said base stations and a mobile station, said system comprising in each base station:
   means for setting and registering the control range of the transmission power for each radio channel;
   means for selecting, upon communication with the mobile station, one radio channel which has a control range corresponding to the necessary transmission power, and allocating the selected radio channel for communication with the mobile station;
   means for providing a selection priority degree and registering a first threshold value to each of the radio channels such that the first threshold value is set at least equal to or higher for the channel having higher priority degree than the lower priority channel; and
   means for allocating of one radio channel having the first threshold value when the transmission power control amount for the communication with the mobile station exceeds the first threshold value.

21. A mobile communications system as claimed in claim 20, wherein the system further comprises:
   means for counting the frequency of interference and compulsory disconnection occurring in service corresponding for each of the first threshold values; and
   means for inhibiting the allocation of radio channel to mobile station whose least level of the transmission power control amount is equal to the corresponding first threshold value when said frequency becomes higher than a predetermined value.

22. A mobile communications system as claimed in claim 20, wherein said system further comprises:

means for setting a second threshold value for each of the radio channels; and means for starting to switch to another available channel, when the average transmission power control amount becomes lower than the second threshold value within a fixed time in service.

23. A mobile communications system as claimed in claim 22, wherein said system further comprises:

means for switching a radio channel in use only to another free radio channel within the same time division multiplexed carrier frequency in which at least one radio channel is accommodated.

24. A mobile communications system as claimed in claim 22, wherein said system further comprising:

means for varying the second threshold value in response to the average transmission power control amount within a fixed time.

25. A mobile communications system as claimed in claim 22, wherein said system further comprises:

means for varying the second threshold value in response to the number of times the transmission power control amount becomes lower than the second threshold value within a fixed time.

26. A mobile communications system as claimed in claim 20, wherein said system further comprises:

means for setting a second threshold value for each of the radio channels, and means for starting to switch to another available channel when the average transmission power control amount becomes higher than the second threshold value within a fixed time in service.

27. A mobile communications system as claimed in claim 26, wherein said system further comprises:

means for switching a radio channel in use to another free radio channel within the same time-division multiplexed carrier frequency in which at least one radio channel is accommodated.

28. A mobile communications system as claimed in claim 26, wherein said system further comprises:

means for varying the second threshold value in response to the average transmission power control amount within a fixed time.

29. A mobile communications system as claimed in claim 26, wherein said system further comprises:

means for varying said second threshold value in response to the number of times the transmission power control amount becomes lower than said second threshold value within a fixed time.

30. A mobile communications system as claimed in claim 20, wherein said system further comprises:

means for varying the first threshold value in response to the average transmission power control amount within a fixed time.

31. A mobile communication system wherein a plurality of base stations are disposed in a service area and radio-communication is performed between one of said base stations and a mobile station, said system comprising in each base station:

means for setting and registering the control range of the transmission power for each radio channel;

means for selecting, upon communication with the mobile station, one radio channel which has a control range corresponding to the necessary transmission power, and allocating the selected radio channel for communication with the mobile station;

means for setting and registering a threshold value for each of the radio channels; and means for starting to switch to another radio channel when the average transmission power control amount becomes lower than the threshold value within a fixed time in service.

32. A mobile communications system as claimed in claim 31, wherein said system further comprises:

means for switching a radio channel in use only to another free radio channel within the same time-division multiplexed carrier frequency in which at least one radio channel is accommodated.

33. A mobile communications system as claimed in claim 31, wherein said system further comprises:

means for varying the threshold value in response to the average transmission power control amount within a fixed time.

34. A mobile communications system as claimed in claim 31, wherein said system further comprises:

means for varying said threshold value in response to the number of times the transmission power control amount becomes lower than said threshold value within a fixed time.

35. A mobile communications system wherein a plurality of base stations are disposed in a service area and radio-communication is performed between one of said base stations and a mobile station, said system comprising in each base stations:

means for setting and registering the control range of the transmission power for each radio channel;

means for selecting, upon communication with the mobile station, one radio channel which has a control range corresponding to the necessary transmission power, and allocating the selected radio channel for communication with the mobile station;

means for setting a threshold value for each of the radio channels; and means for starting to switch to another available channel when the average transmission power control amount becomes higher than the threshold value within a fixed time in service.

36. A mobile communications system as claimed in claim 35, wherein said system further comprises means for switching a radio channel in use only to another free radio channel within the same time-division multiplexed carrier frequency in which at least one radio channel is accommodated.

37. A mobile communications system as claimed in claim 35, wherein said system further comprises:

means for varying the threshold value in response to the average transmission power control amount within a fixed time.

38. A mobile communications system as claimed in claim 35, wherein said system further comprises:

means for varying said threshold value in response to the number of times the transmission power control amount becomes lower than said threshold value within a fixed time.

* * * * *